Dec. 15, 1936.     H. B. COULTER     2,064,151
SEDIMENTATION APPARATUS
Filed June 29, 1935     2 Sheets-Sheet 1
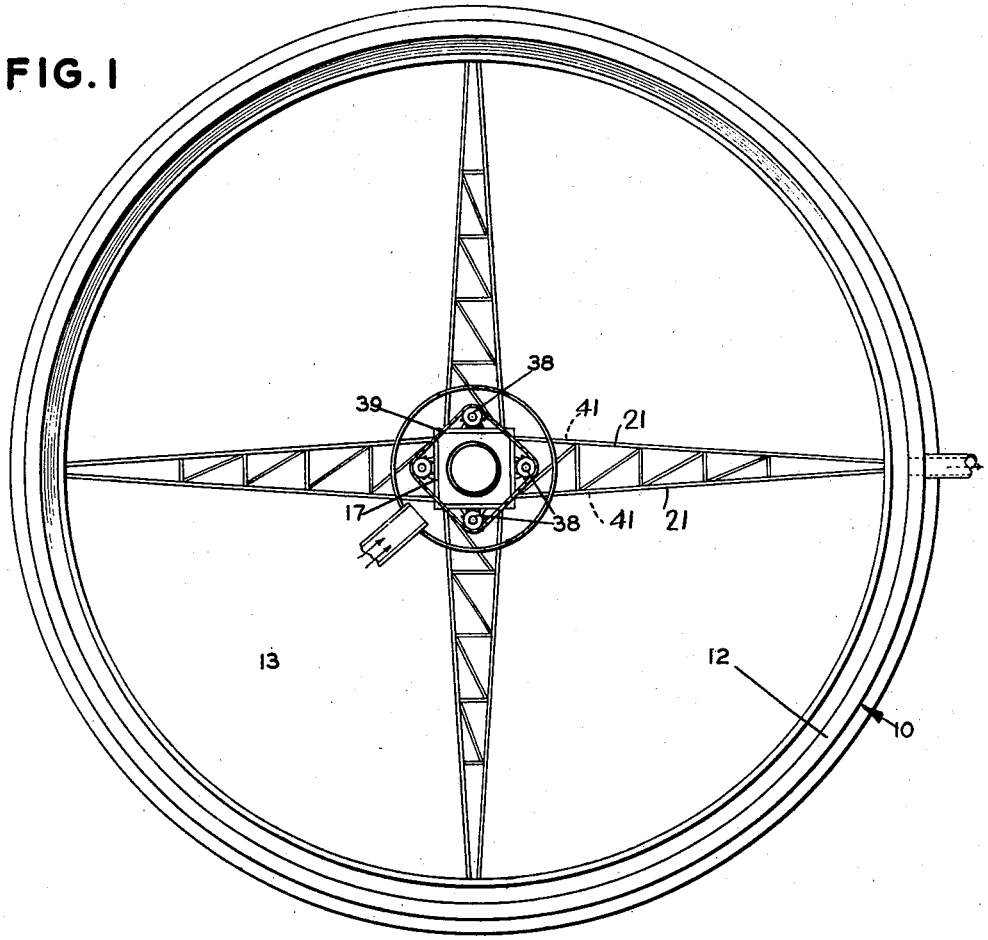
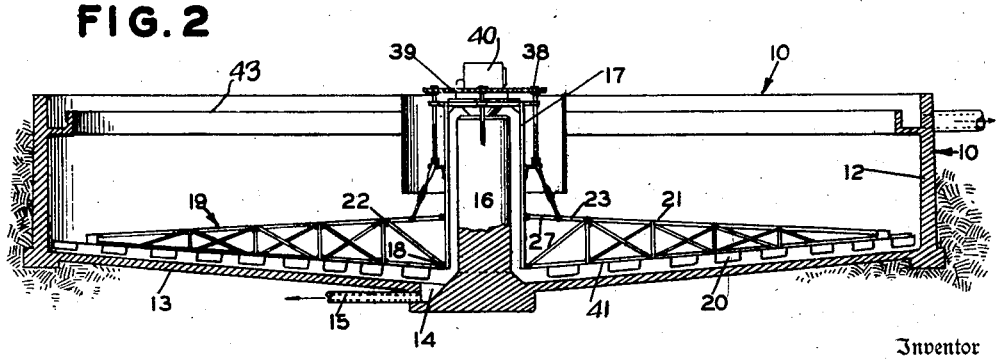
Inventor
HAROLD B. COULTER
BY
Arthur Middleton
Attorney

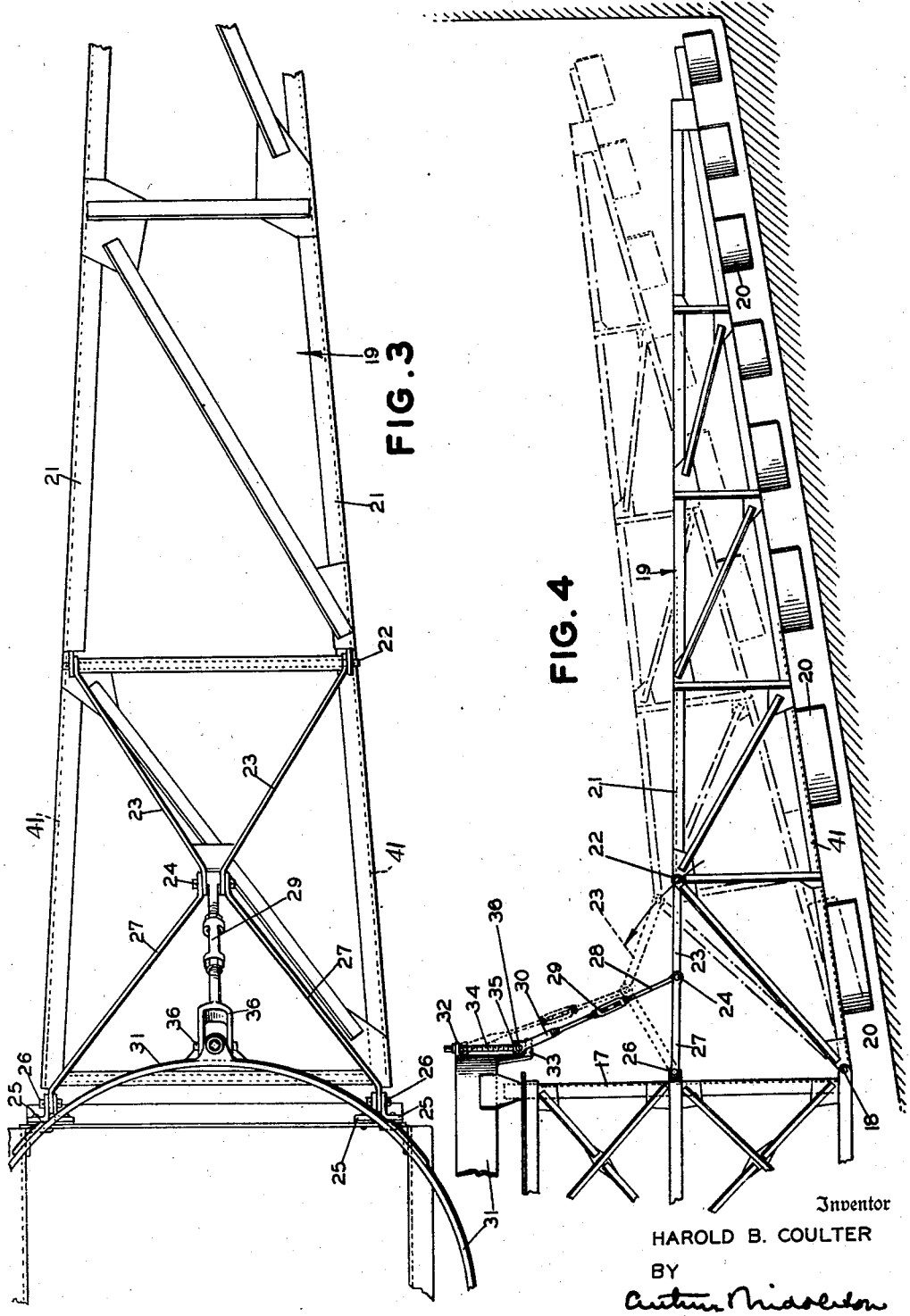

Patented Dec. 15, 1936

2,064,151

UNITED STATES PATENT OFFICE 2,064,151

SEDIMENTATION APPARATUS

Harold B. Coulter, Larchmont, N. Y., assignor to The Dorr Company, Inc., New York, N. Y., a corporation of Delaware Application June 29, 1935, Serial No. 29,129

6 Claims. (Cl. 210—55)

My present invention relates to sedimentation apparatus, and more particularly to an improved form of raking device for raking the settled solids to a central discharge orifice. The invention is particularly useful in sedimentation apparatus which is employed in the settling out of the organic and other solids experienced in the treating or handling of sewage.

In sewage treating apparatus, and also in other types of apparatus, wherein solids suspended in liquids are settled to the bottom of a clarifier by sedimentation, and moved by a raking device to a centrally located solids discharge orifice, it is necessary to periodically repair or inspect the raking device, or to raise the same from the settled solids to effect repairs to the sedimentation tank. Heretofore this has been a difficult operation, due to the fact that the raking device is relatively massive, and could not be raised from the solids or sludge bed until the raking device was stopped. Stopping the operation of the device resulted ordinarily in the device becoming embedded in the bed of settled solids, resulting in a tedious and expensive operation to remove the device for repair or replacement.

In my present invention I have obviated the objections to prior devices of this character, and have designed a raking device comprising a rake carrying arm, or a plurality of such arms, pivotally mounted on a vertical rotatable supporting mechanism. Each said pivotally mounted arm, or arms, is individually supported on the rotatable supporting mechanism, and each arm is provided with mechanism for swinging the arm about its pivot in such a manner as to raise the outer ends of the arms upwardly so as to raise the raking members, attached to the bottom of the arms, upwardly with respect to or out of the solids sludge bed. This upwardly swinging or pivoting movement may be performed while the arms are being rotated by the rotatable supporting mechanism, and thus the arms moved easily upward out of a sludge bed.

The principal object of my invention is an improved raking device for sewage treating apparatus.

Another object of my invention is an improved lifting device for pivotally mounted raking devices for sewage treating apparatus.

A further object of my invention is an improved toggle lifting device for pivotally mounted raking devices for sewage treating apparatus.

The invention possesses other objects and features of advantage, some of which with the foregoing will be set forth in the following description. In the following description and in the claims parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a plan view of a sedimentation tank, showing a plurality of rake carrying arms embodying my invention;

Fig. 2 is a central sectional elevation of Fig. 1;

Fig. 3 is an enlarged plan view of a portion of one of the rake carrying arms, showing the lifting mechanism in detail; and Fig. 4 is a side elevation, on a smaller scale, of Fig. 3, showing the rake carrying arm in normal operating position in a sedimentation tank, and in raised position therein.

Referring to the drawings, 10 designates a sedimentation tank for receiving a liquid or a liquid-solids mixture to be subjected to sedimentation and in which is held the liquid from which solids in suspension are to be removed. This tank 10 is provided with a side wall 12 and a bottom 13. The bottom 13 slopes generally downward toward the center, where there is provided a sludge discharge hopper or sump 14, from which the sludge is removed through a discharge pipe 15. Solids settling to the bottom 13 in the form of sludge are raked by slowly moving rake blades 20 toward the discharge hopper 14, which is sometimes referred to as the sedimented solids discharge. The tank also has marginally disposed in respect thereto an effluent launder 43 constituting a part of what may be referred to and viewed as a supernatant liquid withdrawal means leading from the upper portion of the tank.

Located centrally with respect to the bottom 13 and extending upwardly therefrom to the desired height is a pier 16 providing a stationary bearing support that is fixedly positioned in respect to the tank. On the pier 16 or as otherwise expressed on the stationary bearing provided on or by the pier there is rotatably mounted a rectangular framework or arm carrying structure 17, which extends downwardly with the tank and surrounds the pier 16. This framework 17 is preferably constructed of angle iron and at its lower end is provided with pairs of aligned bearing members 18. The framework 17 is sometimes referred to as a horizontally-turnable rake-arm carrying support which is turnable or rotatable about a vertically extending axis. Motivating means for effecting turning of the horizontally rotatable framework 17 is indicated at 40 and may be of a type of motivated operating mechanism such as is disclosed in and by the Scott U. S. Patent No. 1,888,743, granted November 22, 1932. In the specific arrangement such pairs of bearing members are horizontally aligned, providing a horizontal axis in which the arms are pivotally mounted. These bearing members, however, need not necessarily be horizontally aligned.

The pairs of aligned bearing members 18 are symmetrically arranged about the periphery of the framework 17, and in the present instance I have shown four such pairs.

In each pair of aligned bearing members 18 is pivotally mounted the lower inner end of a rake arm 19. Each rake arm 19 has secured to its lower surface a plurality of spaced rake blades 20, inclined at an angle to their direction of rotation, and functioning to effect a compound forward and inward movement of the material being operated upon. The rake blades 20 may be viewed as collectively constituting a sedimented solids raking element that functions to effect the raking and transferring of sedimented material from diverse sections of the tank, or as otherwise expressed, from diverse sections of the tank bottom into the sedimented solids discharge provided by the sludge receiving hopper 14.

The rake arms 19 are preferably constructed of angle iron or other structural shapes, embodied in a relatively rigid skeleton type of arm structure designed for lightness and strength. Of each rake arm structure 19 the upper members 21, which are sometimes referred to as upper longitudinals, are shorter in length than the lower members 41, which are sometimes referred to as lower longitudinals, in order to provide a receiving space for the toggle joint or linkage mechanism to be hereinafter described. The inner ends of such upper members or longitudinals 21 are provided with aligned holes through which extend the ends of a shaft 22. In the construction shown, such holes are preferably but not necessarily horizontally aligned. They should, however, be arranged parallel to the aligned bearing members 18. Pivotally mounted on the shaft 22, adjacent to the ends thereof, are members 23 which extend inwardly towards the framework 17. The inwardly extending ends lie parallel to each other and are perforated to permit the passage therethrough of a shaft 24 constituting the hinge pin of a toggle joint construction hereinafter referred to.

Each rake arm 19 having spaced rake blades 20 thereupon or carried thereby is sometimes referred to as a structural rake providing arm because of the fact that the raking blades 20 collectively constitute a solids raking element which is in effect embodied in and constitutes a part of the structural rake-arm construction. A reference to the drawings will make it clear that the inner ends of the lower longitudinals 41 are transversely spaced (that is, horizontally spaced) from each other; that the inner ends of the upper longitudinals 21 are transversely spaced (that is, horizontally spaced) relative to each other and that the inner ends of the upper longitudinals are transversely spaced (that is, vertically spaced) relative to the inner ends of the lower longitudinals. An inspection of said drawings also makes it clear that the several longitudinals gradually converge or approach each other in passing toward the outer or free end of the arm and that they are rigidly connected or interconnected into a skeleton type of structural formation through the medium of transversely extending tie members and braces, whereby a relatively rigid tapering-arm structure is provided. Also as is herein pointed out it is to be noted that the inner ends of two of the longitudinals, to wit, of the two lower longitudinals have a pivotal connection to the rake arm carrying structure because of transversely spaced, specifically horizontally spaced, hinges or hinge members provided therefor at 18, to wit, between the inner ends of each arm on the one hand and the lower portion of the arm carrying structure on the other hand. The toggle link construction or toggle link mechanism as provided by the toggle links 23 and 27 is preferably located so that when the links of the toggle construction occupy an extended or open position, they are in substantial alignment with the upper longitudinals 21.

Secured to the framework 17 are pairs of bearing members or brackets 25, in each pair of which is secured a shaft or trunnion 26. On each of the shafts or trunnions 26 is pivotally mounted the rear end of members 27, which members extend inwardly and outwardly. The outer ends lie parallel to each other and are pivotally mounted on the shaft 24. The members 23 and 27 form the links of a toggle joint of which the shaft 24 is the hinge. As is indicated above the toggle joint as provided by a set of pivotally connected link members 23 and 27 when interposed between and connected to the upper longitudinals 21 on the one hand and the arm carrying structure 17 on the other hand constitutes what may be viewed and termed as a toggle linkage mechanism that is relied upon for positionably supporting the rake arm 19 in the lower full operating position therefor, in an upper relatively inoperative position therefor and in any intermediate position therefor. This toggle joint including the members 27 and 23 has one end thereof connected at 26 to the framework 17, and the other end thereof connected to the upper portion 21 of the arm 19 at 22, and when the toggle joint is extended to the position in which the members 27 and 23 are in alignment, it in effect provides an expansible and contractible chord of the arm structure.

On the shaft 24, between the pairs of parallelly arranged ends of the members 23 and 27, is pivotally mounted the lower end 28 of a lever or link. The upper end is threaded to receive one end of a turn buckle 29. The turnbuckle is also attached to the threaded lower end of a link member 30. The pairs of members 23 and 27, being pivotally attached together, and pivotally attached at each end, constitute a toggle joint or toggle linkage, which when in either extended or adjusted position, rigidly holds the rake arms 19 in a positioned operative position, and which also constitute a device for raising the outer ends of the rake arms 19 about the pivot 18 to an abnormal or inoperative position therefor.

Mounted on the framework 17 is a support 31 of any suitable form. Mounted on the support 31, immediately above the rake arms 19, are upper and lower bearing members 32 and 33, respectively. Rotatably mounted in the bearing members 32 and 33, is a vertical threaded shaft 34, the top end of which projects upwardly above the upper bearing 32 and which projecting end is multi-sided or non-circular for the reception of a wrench.

Mounted on the threaded shaft 34 is a cross-head 35, having formed thereon stub shafts 36 on which is pivotally mounted the upper forked end of the link member 30.

The rake arms 19 are shown in their normal operative position within the sedimentation tank 10; and rotary movement of the framework 17 will result in the raking blades 20 raking the settled solids in the tank inwardly toward the center of the tank.

Should it become necessary or desirable to lift the rake arms, with attached blades 20, in respect to or out of the settled solids or sludge in the tank 10, this may be easily accomplished by rotating the threaded shaft 34 so as to move the cross-head 35 upwardly. The toggle, composed of the members 23 and 27, is broken, and the link members 28 and 30 move the shaft 24 upwardly. The shaft 22, on the rear end of the upper members 21 of the rake arm 19, moves upwardly and rearwardly, as indicated by the arrow in Fig. 4, and the rake arm 19 moves into the dot and dash line position in such Fig. 4, with the raking blades 20 moved upwardly with respect to or out of engagement with the settled solids or sludge in the tank 10.

Each rake arm may be independently movable, as illustrated in Figs. 3 and 4, and as above described, or the plurality of rake arms may be interconnected so as to be moved into and out of their operative position simultaneously.

Such an arrangement is shown in Figs. 1 and 2, where a sprocket wheel 38 is secured to the upper ends of each of the threaded shafts 34. Such sprocket wheels 38 are equal in pitch and diameter and lie in the same horizontal plane. Over the sprocket wheels 38 runs the endless sprocket chain 39. It is obvious therefore that rotation of either of the threaded shafts 34 will result in the simultaneous rotation of all of the threaded shafts 34 and therefore the simultaneous movement of the rake arms 19 into or from their normal operative position with respect to the bottom 13 of the tank 10.

The screws 34 and the parts actuated thereby and connected to the knee or joint portion of the toggle linkage at 24 may be considered as a toggle actuating means which is carried by the turnable arm carrying support and which is operatively connected to the toggle linkage whereby incident to a positioning of the linkage the rake arm controllably positioned thereby can be placed either (a) in its lower raking or normal position therefor, or (b) in an extreme upper or abnormal position therefor, or (c) in any one of a plurality of intermediate positions.

The mechanism that includes the endless sprocket chain 39 and the several sprockets 38 may be viewed as a part of a mechanism common to the several screws for simultaneously actuating the screws and thereby the linkage mechanism and thus effect a simultaneous positioning of the several rake arms.

What is claimed is:

1. A sedimentation unit comprising in combination a tank for receiving liquid to be subjected to sedimentation having a supernatant liquid withdrawal means leading from the upper portion thereof and a sedimented solids discharge leading from the lower portion thereof; a stationary bearing member fixed in relation to the tank; a horizontally turnable arm carrying support mounted on said stationary bearing so as to turn about a vertically extending axis; means for imparting horizontal turning movement to said arm carrying support; a rake providing arm; transversely spaced hinges providing pivotal connections between the turnable arm carrying support on the one hand and the inner end portion of the rake providing arm on the other hand; a toggle linkage interposed between and respectively connected to the turnable arm carrying support and an upper section of the inner end portion of the rake providing arm; and toggle actuating means carried by the turnable arm carrying support and having operative connection to the toggle linkage; said rake providing arm comprising at least three longitudinals and transversely extending tie members and braces all connected into a skeleton type of structural arm construction in which the inner ends of the longitudinals are transversely spaced in respect to each other at the inner end portion thereof; the hinge connections above referred to being disposed in the immediate vicinity of the inner ends of two of the longitudinals and the toggle construction referred to being arranged so that when the links of the toggle construction are fully extended they are in substantial alignment with another of the longitudinals.

2. A sedimentation unit as defined in and by claim 1, according to which the longitudinals are arranged so as to gradually converge toward each other in passing from the inner end portion of the arm to the outer end portion thereof.

3. A structural unit as defined in and by claim 1, according to which there is provided a set of lower longitudinals that have a hinge connection to the turnable arm carrying support, according to which there is a set of upper longitudinals, and according to which the toggle linkage is connected to the longitudinals of the upper set and is positioned so that when extended it provides a tension type of connection member between the upper longitudinals and the arm carrying support.

4. A sedimentation units as defined in and by claim 1, according to which the set of longitudinals having the hinge connections in the immediate vicinity of the inner ends thereof provide a set of lower longitudinals, according to which the toggle construction when extended in effect becomes a tension member constituting a continuation of an upper set of longitudinals, and according to which the several longitudinals gradually converge in passing from the inner end portion of the arm to the outer end portion thereof.

5. A sedimentation unit as defined in and by claim 1, according to which a plurality of rake providing arms are pivotally connected and disposed in symmetrical arrangement to and about the arm carrying support and are disposed over and adjacent to the bottom of the tank so that incident to a horizontal turning of the arm carrying support there is effected an impelling and transferring of sedimented solids toward and to the sedimented solids discharge, according to which there is a toggle linkage for positioning each arm, and also according to which there is an actuating means common to the several toggle linkages for simultaneously positioning the several toggle links and thereby the rake providing arms.

6. An improved rake carrying arm lifting device comprising, in combination, a support, an elongated rake carrying arm substantially rectangular in cross section, pivotally mounted at one end to the lower portion of the support, for pivotal movement in a vertical plane, a toggle joint having its ends connected to the support and rake carrying arm respectively, a threaded shaft rotatably mounted on said support, means for rotating said shaft, a cross head mounted on said shaft and movable along the threads thereof, and a link pivotally connected to said cross head and the hinge of the toggle joint, whereby vertical movement of the cross head operates the toggle joint to raise or lower the free end of the rake carrying arm.

HAROLD B. COULTER.